Jan. 24, 1933.  L. M. YOUNG ET AL  1,895,426
PIPE COUPLING
Filed Dec. 28, 1929
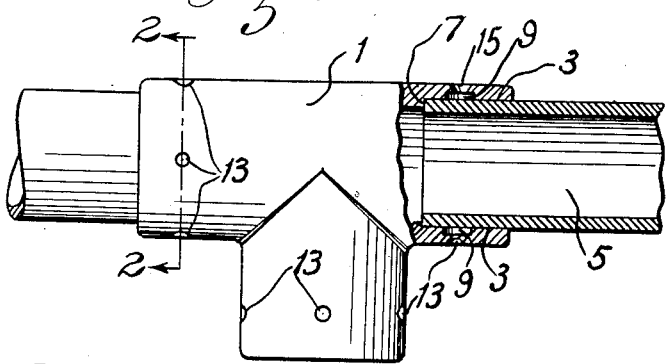
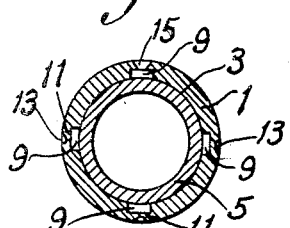
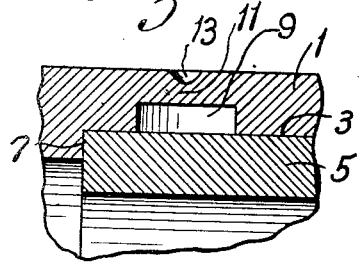
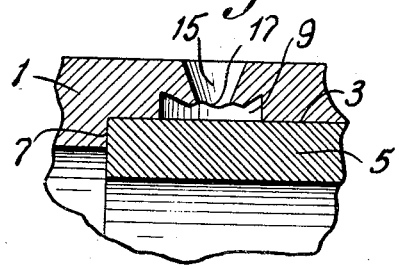
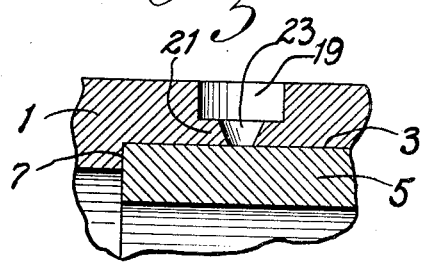
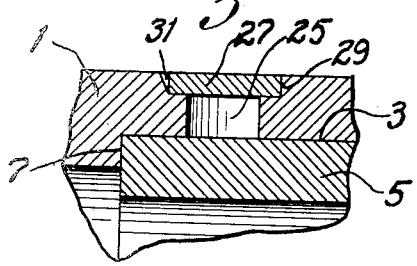
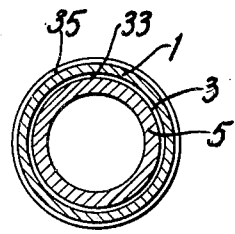
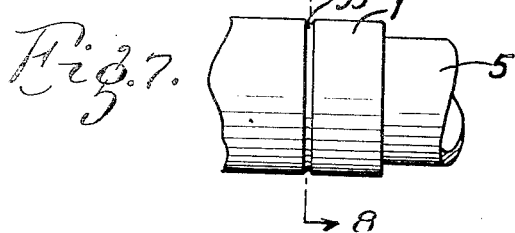

Patented Jan. 24, 1933

1,895,426

UNITED STATES PATENT OFFICE

LEON M. YOUNG, SAMUEL EUSEY, AND DAVID E. LINDQUIST, OF PORT HURON, MICHIGAN, ASSIGNORS TO MUELLER BRASS CO., OF PORT HURON, MICHIGAN, A CORPORATION OF MICHIGAN

PIPE COUPLING

Application filed December 28, 1929. Serial No. 417,167.

This invention relates to pipe couplings, and with regard to certain more specific features, to pipe couplings embodying the soldering or sweating principles.

Among the several objects of the invention may be noted the provision of a pipe coupling of the class described which is adapted for use under varying relative positioning and accessibility, a pipe coupling which includes means for securely fastening a pipe end thereto without the use of screw threads or the like; a pipe coupling of the class described which provides a plurality of readily openable sprues which are normally closed to prevent leakage of solder therethrough, said sprues being arranged peripherally around the coupling or fitting to permit introduction of solder at the most advantageous and/or accessible point; a pipe coupling of the class described which includes normally closed sprues adapted to be opened with ordinary tools and without special skill; a pipe coupling of the class described which is easily and cheaply fabricated and which is durable and strong in use. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawing, in which are illustrated several of various possible embodiments of the invention, Fig. 1 is an elevation, partly in section, of a preferred form of coupling;

Fig. 2 is a cross section taken on line 2—2 of Fig. 1;

Fig. 3 is an enlarged section of a portion of Fig. 1 taken prior to a punching operation;

Fig. 4 is an enlarged section similar to Fig. 3 taken after a punching operation;

Fig. 5 is an enlarged section similar to Fig. 4 showing a modified form of the coupling;

Fig. 6 is an enlarged section similar to Fig. 4 showing a second modified form of the coupling;

Fig. 7 is an elevation of a third modified form of the coupling; and

Fig. 8 is a cross section taken on line 8—8 of Fig. 7.

Similar reference characters indicate corresponding parts throughout the several views of the drawing.

Referring now more particularly to Fig. 1, there is illustrated at numeral 1 a pipe fitting, or, more specifically, a T. The T is shown as exemplary only; it is to be understood that the type of coupling described herein is equally applicable to all types of pipe fittings, such as nipples, L's, reducers, crosses, reducing T's, and the like.

The right-hand end of the T 1 has been broken away to show more clearly the interior construction thereof. At numeral 3 is indicated a socket, or female portion, which is bored, cast or otherwise formed in the T 1. The socket 3 is of a diameter sufficient to accommodate a pipe end 5 which is illustrated in position in the T 1. It is desirable that the diameter of the socket 3 be somewhat larger than the internal diameter of the T 1, so that an annular restricted portion or shoulder 7 is formed, said shoulder 7 serving to limit the degree of insertion of the pipe end 5 and simultaneously aid in effecting an axial alignment of the pipe end 5 in the T 1.

It is to be understood, however, that the shoulder 7 is merely desirable, and not a necessary feature of the invention.

Spaced peripherally around the interior walls of the socket 3 are a number of recesses 9 (four in the present embodiment). The recesses 9 are preferably bored or otherwise formed in the T 1 so that they extend radially outwardly (see Fig. 2) towards the outer surface of the T 1, leaving a thickness of metal 11 which may readily be punched through as will be described hereinafter. The relationship of the recess 9 and the T-wall 11 is more clearly indicated in enlarged view (Fig. 3).

While four recesses 9 are shown in the present drawing, it is to be understood that any suitable number of such recesses 9 may be provided, depending upon the diameter of the fitting, the use to which it is to be put, and the like. For example, in the application of the invention to a nipple, it may be necessary to provide only one recess 9, inasmuch as a nipple may generally be positioned so that the recess 9 is at the top thereof (the position at the top being the most desirable one, as will be pointed out hereinafter). Further, it is to be noted that the recesses 9 need not be positioned in a single plane perpendicular to the axis of the fitting, as shown; it may be desirable in some cases to stagger said recesses or otherwise position them in different planes, depending upon the type of fitting, the relative accessibility of the place at which it is to be used, and the like.

Opposite the recesses 9 on the exterior of the T 1 are provided a number of indicator dents 13. The dents 13 serve indicating purposes and permit a user to quickly find from the exterior of the fitting the relative location of the recesses 9 therein. Other suitable indicating means, such as a painted dot or the like, may be used, or the indications 13 may be entirely disposed of in such instances where the location of the recesses 9 is evident from the nature of the fitting itself.

The T or fitting 1 is used in the following manner:

After the positioning of the fitting 1 in the piping outlay, it is determined which of the recesses 9 is located on the top of said fitting. To the indicator dent 13 corresponding to this particular recess 9 is then applied a punch, which is manipulated to punch through the thickness of metal 11, thereby forming a sprue or opening 15 from the exterior of the fitting 1 to a recess 9, as indicated in Fig. 4.

When the sprue or opening 15 is formed, it is generally noted that a jagged edge or burr 17 is produced by the punch. However, inasmuch as this burr 17 is entirely within the recess 9, it does not project into the socket 3 to deform said socket or otherwise preclude ready insertion of the pipe end 5. This housing of the burr 17 within a recess 9 is one of the important functions of said recess.

After the sprue 15 has been formed, the pipe end 5 is inserted in place, the shoulder 7 aiding in properly positioning said pipe end. It is to be noted that in the present form of the invention the pipe end 5 may also be inserted into the fitting 1 prior to the punching operation above described, inasmuch as the recess 9 protects said fitting, and said pipe end as well, from deformation as above described. The fitting 1 is next heated externally, by means of a blow torch or the like, particularly around the pipe end 5; after sufficient heating, a strip or bar of solder or like bonding material is introduced into the sprue 15. The heated fitting and pipe end melt the solder in the sprue 15, and the melted solder runs or seeps around the entire joint between the pipe end and the fitting, thereby forming a seal between said pipe end and said fitting, and establishing a coupling. After a sufficient amount of solder has been introduced, the fitting is allowed to cool and the solder hardens to form a permanent, strong, durable, sealed coupling.

While it is preferred to introduce the solder in the method described above, it is to be noted that said solder may be introduced in other manners, as for example introducing it in a molten condition by pouring it into the sprue 15, in which event the fitting 1 is not necessarily heated.

By the terms bonding material, or solder, is meant such sealing materials that become liquid or flowing when heated, and which solidify or otherwise congeal when cooled, to effect a seal. Inasmuch as the present invention is applicable primarily to copper and brass piping and fittings, suitable solders include ordinary plumber's solder, lead, spelter, brazing material, fusible metal, and others of like characteristics.

It is desirable (although depending upon the particular nature of the solder being employed) that the pipe end and/or the fitting be fluxed, or otherwise cleaned, in advance of the described soldering operation. This statement holds true for the various forms and embodiments set forth hereinafter.

The advantages of the normally closed recesses 9 are many. In the first place, with the prior art single open sprue leading to the interior of a fitting, it is necessary to provide a different location of the sprue for different angular positionings of the fitting, thereby necessitating many different stock commercial forms. If such different forms were not provided, and all fittings had the open sprue in the same location, it would become necessary at times to feed the molten solder directly upwardly into the sprue and fitting in order to obtain a sealed joint. The obvious difficulty of such a procedure need not be emphasized. The present invention overcomes such a difficulty by presenting a single form or commercial fitting which is designed to have an openable sprue at all times approximately on the top of said fitting, so that solder is fed downwardly thereinto. The present invention also presents advantages over a fitting which embodies a number of peripherally spaced normally open sprues, in that such a fitting permits solder introduced at a top sprue to run out open sprues at the bottom, thereby greatly enhancing the difficulty of obtaining a completely sealed joint.

In Fig. 5 is illustrated a modification of the invention. Herein the fitting 1 is provided on its outer surface with a number of peripherally spaced, inwardly extending recesses 19, with a thickness of metal 21 between said recesses 19 and the interior of the fitting 1. In this embodiment the recesses 19 are their own indicators, being on the exterior of the fitting. In use, the thickness of metal 21 is punched through at the proper recess as determined hereinbefore, thereby forming an open sprue 23, through which solder is poured to effect a seal as described hereinbefore. This type of recess is particularly applicable to large fittings, wherein small interior surface distortions are of substantially no consequence, or to fittings into which the pipe end can be driven to effect a smoothing of any distortions.

In Fig. 6 is illustrated a third embodiment of the invention wherein the fitting 1 is provided with a number of peripherally spaced openings 25 which extend entirely through said fitting. The openings 25 are normally closed by a plug or disc or the like 27, which is preferably held tightly in position in a socket 29, for example. A dent 31 is preferably provided so that a screw-driver or like tool may be inserted to remove a disc 27. In this embodiment, the openings 25 are normally all closed by the discs 27. In use, the uppermost opening is determined, this is opened by removing the disc 27, and an open sprue is formed through which solder may be introduced as described hereinbefore. This embodiment of the invention is more particularly adaptable to large fittings than to small fittings.

Figs. 7 and 8 illustrate a fourth embodiment of the invention. In these figures the interior recesses 9 of the Fig. 1 embodiment have been extended and joined to form an interior peripheral groove 33. Similarly the indicator dents 13 have been extended and joined to form an exterior peripheral indicator groove 35. It is to be understood, as in the Fig. 1 embodiment, that the groove 35 is for indication purposes only, and may be omitted or substituted by painting and the like as described hereinbefore. In this embodiment of the invention, a sprue may be punched in the manner described at any peripheral location, and the user is not even limited to the preformed recesses. This embodiment is otherwise utilized in the same manner as the Fig. 1 embodiment. It is to be noted that Fig. 3 substantially shows this fourth embodiment of the invention in section, in addition to showing the Fig. 1 embodiment.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

We claim:

1. In a pipe coupling comprising a fitting having a portion thereof adapted to receive a pipe end, means for introducing a bonding material between the fitting and the introduced pipe end comprising at least one place on the walls of said portion thinner than the remainder of the walls of said portion adapted to be opened from the exterior of the fitting to provide a sprue.

2. In a pipe coupling comprising a fitting having a portion thereof adapted to receive a pipe end, means for introducing a bonding material between the fitting and the introduced pipe end comprising at least one recess on the interior of said fitting, and an indicating means on the exterior of said fitting located over said inner recess, said recess providing at least one wall region of said portion weaker than the remainder of the walls of said portion, adapted to be opened from the exterior of the fitting to provide a sprue.

3. In a pipe coupling comprising a fitting having a portion thereof adapted to receive a pipe end, means for introducing a bonding material between the fitting and the introduced pipe end comprising at least one recess on the exterior of said fitting, said recess providing at least one wall region of said portion thinner than the remainder of the walls of said portion adapted to be opened from the exterior of the fitting to provide a sprue.

4. In a pipe coupling comprising a fitting having a portion thereof adapted to receive a pipe end, means for introducing a bonding material between the fitting and the introduced pipe end comprising an interior annular groove in said portion and an exterior annular groove on said portion located over said interior groove, said grooves providing a circumferential wall region of said portion thinner than the remainder of the walls of said portion adapted to be opened from the exterior of the fitting to provide a sprue.

In testimony whereof, we have signed our names to this specification.

LEON M. YOUNG.
SAMUEL EUSEY.
DAVID E. LINDQUIST.